Feb. 9, 1965    F. L. BARTELS    3,168,917
METHOD OF ATTACHING FRAMES TO AIR FILTERS AND THE LIKE
Filed Aug. 2, 1960    2 Sheets-Sheet 1
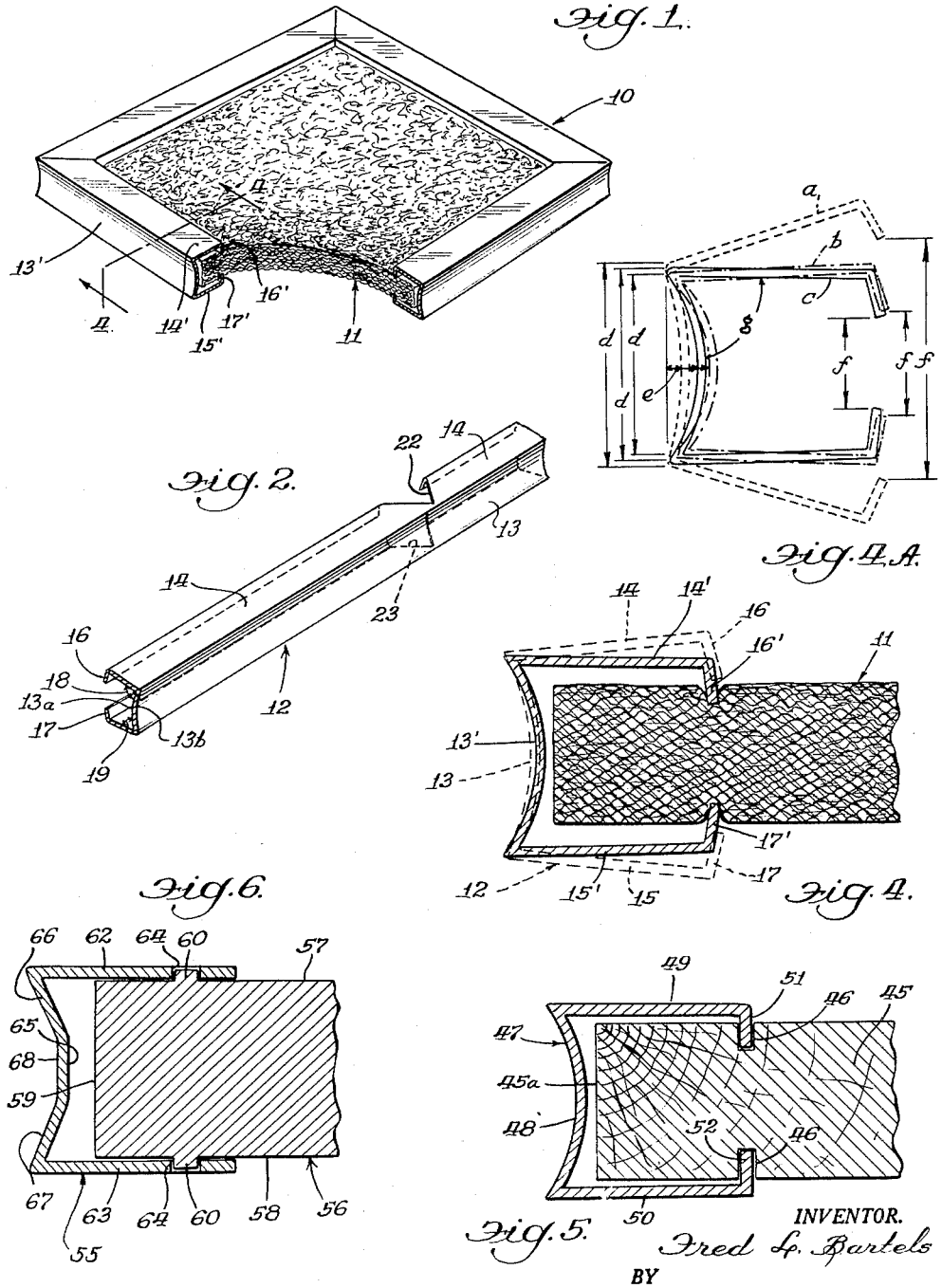
INVENTOR.
Fred L. Bartels INVENTOR.
Fred L. Bartels United States Patent Office 3,168,917
Patented Feb. 9, 1965

3,168,917
METHOD OF ATTACHING FRAMES TO
AIR FILTERS AND THE LIKE
Fred L. Bartels, Madison, Wis., assignor to Research Products Corporation, Madison, Wis., a corporation of Wisconsin
Filed Aug. 2, 1960, Ser. No. 47,074
7 Claims. (Cl. 153—1)

The present invention relates to frames or holding devices for air filter media or the like, and a method of attaching a frame-like holding device to an article such as an air filter pad.

Although, as will become apparent as this specification proceeds, the frame or holding device of this invention has many useful applications, in the interest of clarity and by way of example, it will be described as used with air filters to provide frames for air filter units.

The principal object of the invention is to provide a framing or holding member which can be readily and firmly mounted upon a panel-like object, such as an air filter body or media, as a frame or holder therefor, and to provide a novel method of securing a firm, resilient grip of the frame upon such object.

Room and window ventilators and air conditioners and ducts or filter cells in which air filters are located provide for filter units of many different sizes. For a dealer to stock all of the different sizes and types of air filters requires a very substantial investment for inventory and a large storage area in which to keep that inventory.

As applied to air filters, an important objective of the invention is to enable the dealer to quickly and easily produce an air filter of a required size and type in his own place of business with relatively simple and inexpensive equipment. Thus, the only inventory that the dealer need maintain is a stock of the various types of panel filtering media that might be desired, and a supply of the frame stock from which the frames can be made to protect the edges of the media panels during handling and cleaning, facilitate installation and removal, improve the air seal at the edges of the unit, and generally to improve the appearance of the filter and prolong its life. When an order is received for a filter of a particular size and containing a specified type of filter material, the dealer can cut the filter pad to size from stock and form a frame of the required dimensions for holding the filter media.

In forming a frame for a filter pad, or in forming a holding device for other objects, one of the desirable attributes is that the frame fit snugly upon the filter pad or object, and securely engage the same to prevent their undesired separation when in use. When sheet material of the type that might be used in a filter frame, for example, is bent, even beyond the elastic limit of the material, there is some residual resiliency in the metal at the bend which acts, after the bending pressure is removed, to return the bent portions to some extent towards their original positions before bending. In other words, while, in the main, the elastic limit of the material is exceeded during the course of the bending operation so that to some extent the bend will remain after the bending pressure is removed, to some extent there is some residual elasticity producing some recovery. This recovery will normally cause the frame to grip the filter pad less tightly than it did while the bending pressure was applied, so that the frame and pad may not be securely engaged. Furthermore, this recovery and release may result in an unsightly appearance of the completed filter.

By employing the invention herein described, this tendency toward recovery is utilized so that, instead of resulting in releasing and loosening, the holding device, e.g. filter frame, may be made to grasp the object, e.g. filter pad, more tightly after the bending pressure is removed than it did while it was subjected to that bending pressure. While by using my invention the bent portions may be made to move farther after the withdrawal of the bending pressure, this is not necessary. If the particular application so demands, the bent portions, e.g. flanges of the filter frame, may be made to retain the approximate position against the object grasped, e.g. filter pad, that they assumed at the time the bending pressure was applied. The means by which this surprising result is achieved is described herein.

Further objects an advantages will be apparent from the following description taken in conjunction with the drawings, in which:

FIG. 1 is a perspective view of a filter formed in accordance with the invention with a corner thereof broken away;

FIG. 2 is a perspective view of a length of framing channel prepared for use in forming a frame for an air filter;

FIG. 4 is a partial section as viewed along line 4—4 of FIG. 1;

FIG. 4a is a cross-sectional view of the frame showing initial and final configurations and the intermediate position of the frame while under pressure externally applied in the process of applying the frame to the filter media;

FIG. 5 is a view similar to FIG. 4 but illustrating an alternative application of the invention in the holding of, for example, a wooden object;

FIG. 6 is a partial section showing a further alternative embodiment, and

Figure 3:
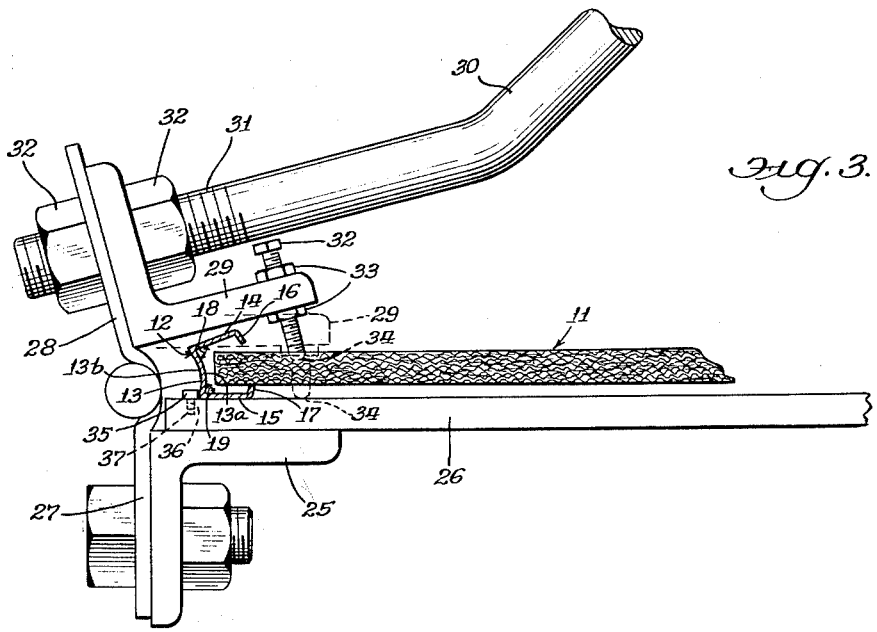
FIG. 3 is an elevational view of a portion of simple apparatus such as might be used in the forming of a frame and application thereof to a filter, and illustrates in section a portion of the filter pad and frame.

The usual method for providing a holding member of the general type of the present invention is to form a channel having two flanges connected by a web. This channel is then placed along an edge of the object on which it is to be mounted with the flanges extending over the edge areas of the sides of the object. The two flanges are bent toward each other to grasp the object. Assuming the material used to have some elasticity, there would be some recovery movement of the flanges when the bending pressure is removed which would cause the flanges to spread apart and separate somewhat from the object. Even though this residual elasticity may be relatively small, it may be undesirable in many applications.

In the method of the invention, in addition to applying pressure to the outer faces of the two flanges to bend them toward each other, pressure also is applied to the web to force curvature of the web with the convex side of the curvature facing the same direction as that in which the flanges extend from the web. This, of course, makes the outer face of the web concave. When the pressures on the flanges and web are removed, the residual resiliency at the lines of juncture of the flanges and the web tends to cause the flanges to move outwardly from the object as in the prior art method above described. At the same time, the residual resiliency in the bent web acts to cause the web to tend to flatten or decrease in curvature to some extent. To the extent that the web flattens, or decreases in curvature, the two flanges of the channel will tend to be turned against the object.

Thus, the residual resiliency at the bend of the channels tends to cause a movement of the channels in one direction while the residual resiliency in the web tends to move the flanges in the opposite direction. By controlling the extent of movement of the pressure-applying means, the two residual resiliency movements upon the removal of the pressures may be made to substantially offset each other, or one may be made greater than the other. This enables the process of the invention to be used to hold the exact position of the flanges with respect to the object upon the removal of the pressures, or, in fact, to press the flanges against the objects to a somewhat greater extent upon the removal of the pressures than was the case at the time the pressures were being applied.

To simplify the equipment needed for general applications of the method of the invention, the web of the channel may be pre-bent before the channel is positioned on the object on which it is to be mounted. Thus, in the preferred method, the web of the channel is preformed so that the face of the web on the side toward which the flanges project is convex and the opposite face is concave. At the same time, the channel is formed with each flange forming an acute angle with the web. The thus preformed channel is then slipped onto the object on which it is to be mounted in the same manner as previously described. Pressure then is applied to the outer faces of the two flanges, with the pressure being so applied as to have two effects. First, the pressure bends the flanges against the object on which it is to be secured and, secondly, the pressure increases the curvature of the web. When the pressure is relieved, the two results above described occur, namely, the resiliency at the bends between the flanges and the web tends to cause the other portions of the flanges to move apart and the resiliency in the web tends to cause the outer portions of the two flanges to move together. The extent to which these will offset each other upon the removal of the pressure can be determined by controlling the extent to which the web is deflected, i.e. increased in curvature, at the time the pressure is applied to the two outer faces of the flanges.

In another practice of my method, the web of the channel is not preformed but may be straight as in prior art procedures. As forming pressure is applied to the flanges to bend them against the object to be gripped, pressure is also applied to the outer face of the web to deflect it towards the edge of the object. The important consideration is to make sure that the curvature forced in the web by the forming pressure is in the right direction, since curvature in the wrong direction would result in adding to the outward movement of the flanges upon removal of the forming pressure rather than nullifying this movement. Thus, when forming pressures are relieved, the same two effects occur, namely, an offsetting of the tendency of the edges of the flanges to turn away from each other with the tendency of them to turn toward each other because of the recovery of the deflected web.

FIG. 1 illustrates a filter embodying, and produced in accordance with, the invention. It comprises a frame generally indicated at 10 holding a filter body 11. The filter body may be any one of a number of types. For example, it might be an impingement type filter comprised of a plurality of superposed expanded metal foil sheets with an adhesive or sticky material thereon, a fiberglass pad, or it might be a strainer type of filter.

Frame 10 is formed from a length of channel a portion of which is illustrated in FIG. 2. Channel 12 has a web 13 from which a pair of flanges 14 and 15 project. Subflanges 16 and 17 extend inwardly from the edges of the flanges 14 and 15, respectively. Subflanges 16 and 17 form engaging means so as to securely connect the frame 10 with the pad 11 as hereinafter described. Alternative means, such as spaced prongs, may be used in place of the continuous subflanges.

The cross-sectional shape of the channel 12 as it is preformed as a new article of manufacture to be stocked along with filtering material and before it is attached to the filter body of filter 11 is best seen in FIG. 3. The web 13 is bent so that the side 13a thereof, the side of the web from which the flanges 14 and 15 project, is convex while the outer face 13b of the web 13 is concave. The internal angle 18 between the flange 14 and the web 13 is an acute angle as is the internal angle 19 between the flange 15 and the web 13. A channel of such shape may be formed from sheet metal.

After the channel is formed and when a dealer, for example, is desirous of preparing a filter of a particular size, 90° notches 22 and 23 are cut at the desired locations along the flanges 14 and 15 so that the channel may be bent at such notches to form square corners of the frame as illustrated in FIG. 1. The distance between the notches is determined by the dimensions desired for the finished filter. A filter body 11 of the proper size is cut from stock. After the channel 12 has been suitably notched, it is wrapped around the filter body 11 to form the frame and the meeting ends are preferably fastened together, as by riveting, soldering, or taping. The next step is to apply pressure to the outer faces of the two flanges 14 and 15 to securely affix the filter body 11 within the finished frame 10.

A simple apparatus for applying the required pressure to the channel is illustrated by way of example in FIG. 3. It comprises a base formed of a metal angle 25 welded to a metal base plate 26. One leaf 27 of each of a pair of ordinary loose pin hinges is welded or otherwise suitably attached to angle 25. The other leaf 28 of each hinge is attached to an angle 29 by the threaded ends of handle 30 which may generally U-shaped for convenient operation. The two threaded ends 31 of the U-shaped handle project through suitable openings in leaf 28 and angle 29. Nuts 32 received on the threads clamp the two parts together. Adjacent the other end of angle 29 is an adjustable stop provided by a bolt 32 threaded through the angle 29 and fixed in place by stop nuts 33. The bottom 34 of bolt 32 is positioned to contact plate 26 and limit the downward pivotal movement of the bolt 32 and, thus, angle iron 29. A positioning stop 35 having pins 36 may be advantageously utilized. A plurality of openings 37 are provided in base plate 26 to receive pins 36. Openings 37 may be drilled at various distances from the hinges so that the position of stop 35 with respect to the pivotal axis of the hinges may be varied. These adjustments will permit some variation to be made in the pressure applied to the web of the framing channel.

The apparatus of FIG. 3 is utilized to apply frame-forming pressure to the channel 10. The intended frame with the filter body 11 therein is positioned on base plate 26 with the back or web of the channel abutting stop 35. Handle 30 is brought downward manually until the bottom 34 of bolt 32 contacts plate 26 as illustrated in dotted lines in FIG. 3. The bottom of angle 29, of course, presses against the outer face of flange 14. A corresponding reaction pressure is applied to flange 15 as it is pressed against base plate 26.

The effect of this pressure is illustrated in FIG. 4. The shape of the channel 12 before pressure is applied is illustrated in dotted lines in FIG. 4, or, as will be explained with reference to FIG. 4a. The application of the pressure bends the channel into approximately the shape illustrated in full lines, or, as will be explained with reference to FIG. 4a, slightly beyond the position shown. Thus, the two flanges 14 and 15 move to the position illustrated at 14' and 15', subflanges 16 and 17 moving to the position illustrated at 16' and 17', at which position they may dig into the filter body 11, as illustrated, to engage it. The curvature of the web 13 is increased so that the web moves approximately to the 13' position.

It should be noted that stock channel 10 is formed with the flanges diverging sufficiently to permit easy insertion of the filter pad 11. When the frame forming pressure is applied to mount the frame upon the filter, the flanges are forced together to engage the filter pad, as described, this movement necessarily being sufficient to exceed the elastic limit of the material at the junctures of the flanges with the web, whereby permanent deformation is effected to decrease the internal angles between flanges and web. The movement of the pressure faces of the machine of FIG. 3 may or may not be sufficient to permanently deform the web to permanently increase the curature thereof, but normally the web would be bent somewhat beyond the elastic limit of the material.

When the pressure on handle 30 is removed, the resiliency of the material at the bends between the flanges 14' and 15' and the web 13' tends to cause the two legs to move away from each other a short distance towards the dashed line position as shown in FIG. 4. By leg is meant the flange and sub-flange thereof. At the same time the resiliency of the web 13' is acting to return the web 13' toward, if not to, the dashed line position 13. This movement of the web resulting from the residual resiliency therein will pivot the flanges 14' and 15' and subflanges 16' and 17' towards each other. Thus, there are two movements caused by residual resiliencies, which two movements are the reverse of each other. The extent to which they offset each other can be controlled within limits by the amount of deflection, or increase in curvature, that is given to the web by the applied pressure and will also depend to some extent on the physical properties of the material of which the channel is made.

A more detailed analysis of what is occuring in the channel as the frame forming pressure is first applied and then released is indicated in FIG. 4a. The configuration of the channel is shown in three sequence positions, dashed lines a illustrating the initial form of the channel, solid lines c illustrating the final form of the frame section, and dot-dash lines b illustrating the strained form of the channel while held under pressure by the frame-mounting machine. It will be noted that the application of the forming pressure to the flanges of the channel reduces the dimension d from an initial maximum to the minimum, increases the dimension e from an initial minimum to the maximum, and reduces the distance f to an intermediate value. At the same time, the web-flange angle g, initially preferably slightly less than 90 degrees, is substantially and permanently reduced. Then, when the frame-forming pressure is relieved, the concave web springs back toward its initial position, decreasing distance e and increasing distance d to intermediate values, while the dimension f is still further reduced to the minimum distance. Thus in the final form of the frame, the gripping channel flange edges are even closer together than while held under pressure, assuring the desirable tight clamping action of the frame.

With initial movement of the pressure faces of the machine after contact with the channel, the outer edge portions of the flanges are moved toward each other. Unless pressure is concurrently applied to the portions of the flanges adjacent the web, this movement will, due to the stiffness of the channel material, cause the curved web to flatten somewhat and, if the initial angle of divergence of the channels were excessive, it is possible that the web would not only flatten but actually deflect with a reverse curvature. If this were to happen, ultimate release of the forming pressure would result in a loosening of the grip of the flanges upon the filter pad even greater than that resulting from recovery at the bends of the flanges. To prevent this action, as well as for other reasons, the divergence of the flanges in the performed channel is minimized and the curvature initially formed in the web is made sufficient to form internal angles with the flanges of less than 90 degrees. With this relationship of the several elements of the framing channel, reversal of the curvature of the web is avoided, it being contemplated that the flanges of the channel will normally be approximately parallel or, in any event, not bent very much beyond the parallel position. Thus, during the final movement of the pressure faces of the machine, the inward curvature of the web is increased over that of the stock channel and the bending at the junctures of the flanges and web is sufficiently severe to permanently deform the metal and bring the flanges permanently closer together in snug relationship with the filter. The result following release of the forming pressure is as above described.

For a more complete understanding of the invention and the mode of operation thereof, the following tests are described.

Test 1

Pressure was applied to the outer faces of the flanges of a channel of the general type illustrated in FIGS. 1–4 by an apparatus having a pair of parallel pressure faces, e.g., a vise. Pressure was applied only to an extent sufficient to render the flanges parallel at the time of the application of pressure with substantially no deflecting pressure being applied across the web. Upon removal of the pressure, the two legs moved apart a substantial distance.

In one test specimen in which the outer surfaces of the flanges at the web were 1.60 inches apart and at the outer edges thereof were 2.10 inches apart before the application of pressure, the specimen was subjected to forming pressure in a vise until the two outer faces of the flanges were parallel (1.60 inches apart). Upon release of the pressure, the flanges pivoted back to a position at which the outer surfaces at the outer edges of the flanges were 1.75 inches apart.

Test 2

A second test specimen identical to that of Test 1 was similarly pressed in a vise, except that after the two flanges were brought into parallelism, the jaws of the vise were closed an additional 0.04 inch. This caused the middle ordinate (dimension e in FIG. 4a) of the curved web to increase by 0.02 inch, from the original 0.24 inch to 0.26 inch, thus increasing the curvature of the web to this extent. When the vise jaws were opened, relieving the pressure, the outer surfaces of the flanges at the outer edges thereof were now 1.50 inches apart while the distance between the outer surfaces of the flanges at the web was about 1.56 inches. Thus, by increasing the curvature of the web, a resilient deflection was provided therein which not only offset the resilient recovery at the bends of the flanges, normally acting to cause the flanges to move apart, but, in addition, actually caused the flanges to pivot toward each other upon the release of the pressure.

In this test, the edges of the two subflanges 16 and 17 were 1.31 inches apart before pressure was applied to the channel. After the application and release of the pressure, the edges of the subflanges were 0.53 inch apart.

Test 3

The third test was performed identically to the second test except that a filter body 11 having a thickness of 0.82 inch was inserted between the flanges of the preformed channel before pressure was applied to the flanges. After the application and release of pressure from the channel in the manner described in connection with Test 2, the edges of the subflanges 16' and 17' were 0.64 inch apart. Thus, they had remained embedded in the somewhat resilient filter body 11 a distance of 0.18 inch. The outer surfaces of the flanges at the outer edges thereof were 1.60 inches apart while the outer surfaces near the web were about 1.56 inches apart.

The foregoing tests illustrate that even though the two flanges are not bent beyond the point at which they are parallel, that parallelism can be maintained if desired after the bending is completed by providing the resilient force in the web to motivate the recovery action which has the effect of offsetting the tendency of the flanges to separate after the bending. Even with the resistance of the embedding of the subflanges in the filter body and the tendency of the resilient filter body to additionally push the flanges apart after the release of pressure, the tendency of the flanges to pivot apart can still be offset. Within suitable operating limits, and depending upon the elastic limit of the material, the deflection of the web, i.e. the change in length of the middle ordinate, can be increased or decreased to change the extent to which the resiliency of the web upon the release of pressure will offset the tendency of the two legs to separate at their outstanding ends.

Substantially any of the materials commonly used for such frames or supports can be employed in connection with my invention. For example, black iron, galvanized iron, mild steel, aluminum alloy such as utility sheet, certain magnesium alloys, or copper, are eminently suitable. My invention may be employed utilizing other materials such as plastics. Materials of the type illustrated that are suitable for use in my invention are described as semi-resilient, readily deformable materials.

FIG. 5 illustrates the application of my invention to form a molding, supporting member, etc., for a solid panel, such as a board, which might be any one of a number of objects, e.g. bulletin board, display board, counter, etc. To enable the channel to positively engage the board 45, the board is provided with a pair of parallel grooves 46 on opposite sides thereof. A channel generally designated at 47 is employed for the frame or molding. Channel 47 has a web 48, a pair of flanges 49 and 50 and subflanges 51 and 52 along the outer edges of the flanges. As the channel is initially formed, the flanges 49 and 50 are positioned a sufficient distance apart so that subflanges 51 and 52 can be readily slipped over board 45 and positioned to enter grooves 46. Web 48 is curved and the internal angles between legs 49 and 50 and web 48 are less than 90°.

With the channel properly positioned along board 45, pressure is applied to the outer surfaces of flanges 49 and 50 to cause subflanges 51 and 52 to enter and seat themselves in grooves 46. Sufficient pressure is applied to cause web 48 to increase in curvature, i.e. deflect in the direction of edge 45a of board 45. Upon the release of pressure, the subflanges 51 and 52 will remain firmly seated in grooves 46. As a matter of fact, by a suitable application of the forming pressure as previously described, the spring action (stored stress within the elastic limit) of the web 48 may be made to increase the resilient clamping pressure of the channel 47 upon the board 45.

FIG. 6 illustrates a further alternative embodiment of a channel generally designated at 55 holding an object 56 having two sides 57 and 58 and an edge 59. Sides 57 and 58 are provided with a plurality of projecting ears 60 for the engagement of the channel on the object.

Channel 55 has a pair of flanges 62 and 63 projecting from a web 65. Each of the flanges are provided with spaced slots or openings 64 which are in register with the ears 60 on object 56. In this embodiment, and for the purpose of illustrating an equivalent form of the invention, the web 65 instead of having the general configuration of a continuous curve between the two legs has two outside straight sections 66 and 67 connected by a central straight portion 68. A web of such a configuration is deemed to have sides that are generally convex and generally concave as those terms are employed herein.

It will, of course, be appreciated from the foregoing description that when channel 55 is formed, the flanges 62 and 63 will be spread somewhat from the position illustrated in FIG. 6. Thus, the channel easily may be positioned along edge 59 of object 56, with the two flanges 62 and 63 in juxtaposition to sides 57 and 58. The internal angles between the flanges and the web in the stock channel are less than 90°.

Openings 64 are aligned with ears 60 and pressure is applied to the outer surfaces of the flanges. As in previous embodiments, sufficient pressure is applied not only to bend flanges 62 and 63 substantially into the position illustrated in FIG. 6, but also to flex web 65 in the direction such that the central straight portion 68 moves closer to edge 59 of object 56. Thus, when the pressure is relieved, the resilient force resulting from the flexing of web 65 and its tendency to return to its original unflexed position pivots flanges 62 and 63 towards each other, overcoming the tendency of the flanges to separate and disengage from ears 60 because of the resilient stress remaining from the bending of the flanges towards each other by the application of the forming pressure.

Figure 7:
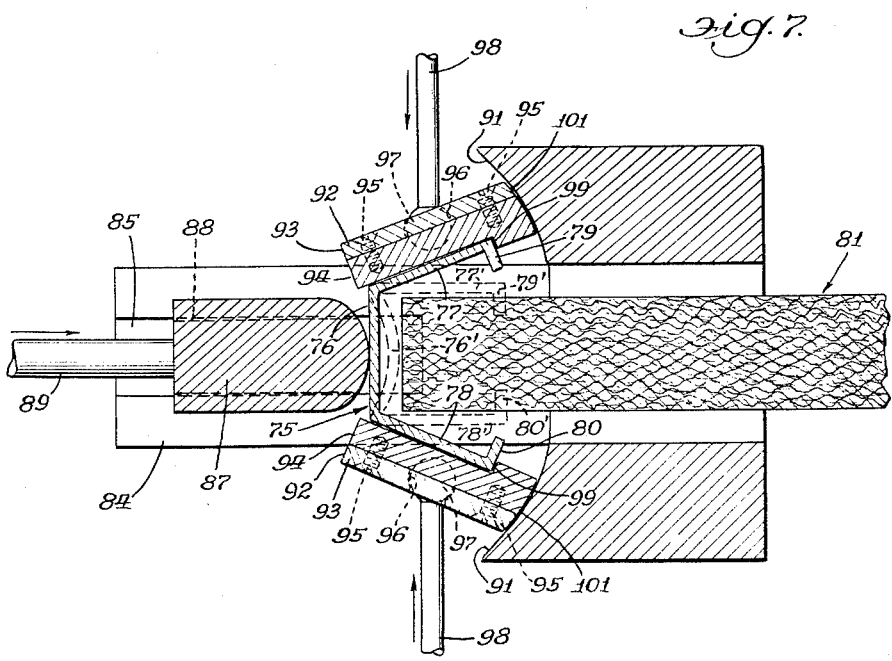
FIG. 7 is a somewhat diagrammatic illustration of an apparatus for the performing of the method of the invention without utilizing the special form of holding member described herein.

FIG. 7 diagrammatically illustrates an apparatus for performing the method of my invention without utilizing a channel having a specially preformed web, such as was described in connection with the previous embodiments. In this alternative, the channel generally designated at 75 has a flat web 76, a pair of flanges 77 and 78 with subflanges 79 and 80 along the outer edges thereof. The apparatus for applying pressure to secure channel 75 to a filter body generally designated at 81, for example, is of such a nature that pressure is applied to web 76 to bend the web into a curve with a concave outer face as well as to bend flanges 77 and 78 towards each other.

The apparatus illustrated comprises a pair of end members 84, on each of which is a slideway 85. A web pressure head 87 has lands 88 across the ends thereof, which lands are received in ways 85 to guide the movement of the pressure head 87. Suitable power means (not shown) is attached to rod 89, which in turn is connected to pressure head 87 to supply the force to bend the web 76, as subsequently described. End members 84 have a pair of abutments 91 extending therebetween to resist the pressure of head 87 against the channel as will be described.

A pair of flange pressure heads 92 are each formed of two bars 93 and 94 fastened together by screws 95. Each has a socket 96 equally spaced in bars 93 and 94 to receive balls 97 on the end of rods 98. Suitable power means (not shown) are connected to piston rods 98 to apply opposing forces for the bending of the flanges toward each other. Each of bars 94 has an abutment 99 against which subflanges 79 and 80 of the channel 75 are pressed. Pressure heads 92 have curved ends 101 formed in the shape of a segment of a circle. Abutments 91 are correspondingly curved to guide the pressure heads 92 into position and resist the pressure applied to the web.

In this embodiment, pressure is applied to web 76 by means of head 87 to bend the original straight web into a curve as illustrated at 76'. In addition, pressure is applied to flanges 77 and 78 by pressure heads 92 to bend the two flanges 77 and 78 together, with the two flanges assuming the position illustrated in dotted lines at 77' and 78'. When these pressures are released, the tendency of flanges 79 and 80 to separate as a result of the resiliency of the material of the channel is at least offset by the resiliency of the stressed web 76', as above described with reference to the previously described embodiments of the invention.

The foregoing description of specific embodiments of the invention is for the purpose of complying with 35 U.S.C. 112 and should not be construed as imposing unnecessary limitations upon the appended claims inasmuch as modifications and variations thereof will be apparent to those skilled in the art, and such modifications and variations are deemed to be within the scope of the invention.

Invention is claimed as follows:

1. The method of mounting a channel of semi-resilient readily deformable material having a web and two flanges extending therefrom onto an object having two sides terminating in an edge, said method comprising positioning said channel on said object with said web extending along said edge and said two flanges extending over the edge areas of said two sides, respectively; applying pressure to the outer surfaces of said two flanges to bend said flanges inwardly with permanent deformation of the material substantially to the desired position in relation to said sides of said object and at the same time to flex said web inwardly in the direction of said edge; and thereafter releasing said pressure to permit said web to unflex and thereby urge said flanges toward each other.

2. The method of mounting a channel of semi-resilient readily deformable material having a web and two flanges extending therefrom onto an object having two sides terminating in an edge, said method comprising positioning said channel on said object with said web extending along said edge and said two flanges extending over the edge areas of said two sides, respectively; applying pressures to bend said flanges and said web of said channel all inwardly sufficiently to engage said object between said flanges and permanently deform said channel at the junctures of said flanges with said web to diminish the internal angles thereat and at the same time stress said web, and thereafter relieving said pressures whereby the stress imposed in said web tends to urge said flanges together to resiliently clamp said object therebetween.

3. The method of mounting a holding member on an object having two sides terminating in an edge, said method comprising: forming a semi-resilient, readily deformable material into a channel having a curved web with two flanges extending from the convex side thereof; positioning said channel on said object with said two flanges extending over the edge areas of said two sides, respectively; applying pressure to the two outer surfaces of said two flanges to permanently bend said flanges substantially to the desired position in relation to said sides and at the same time flexing said web inwardly; and thereafter releasing said presssure to permit said web to unflex and thereby urge said flanges toward each other.

4. The method of mounting a channel-like member having a web and two flanges extending therefrom on an object having two sides terminating in an edge, said method comprising: positioning said channel-like member on said object with said web extending along said edge and said two flanges extending over the edge areas of said two sides, respectively; applying pressure inwardly to the two outer surfaces of said two flanges and concurrently applying pressure to the outside of said web generally along the median portion thereof to flex said web inwardly, the pressures so applied being sufficient to permanently bend said flanges inwardly; and thereafter releasing said pressures to permit said web to unflex and thereby urge said flanges toward each other.

5. The method of making a framed panel-like air filter, said method comprising pre-forming from a semi-resilient, readily deformable material, a framing channel having inwardly curved web with two flanges extending divergently from the convex side thereof and forming acute angles with said web; notching said flanges at the locations of the intended corners of the filter frame; wrapping said notched framing channel around the perimeter of the filter; applying pressure inwardly against the flanges of the channel to concurrently force the flanges toward said filter and flex said web inwardly sufficiently to permanently bend said flanges inwardly; and thereafter relieving the pressure to permit said web to unflex and thereby urge said flanges into resilient clamping engagement with said filter.

6. The method of claim 5 wherein the pressure is applied to the flanges sufficiently to bring said flanges into engagement with the filter.

7. The method of claim 5 wherein the pressure is applied to the flanges of the framing channel along each side of the filter serially.

References Cited by the Examiner
UNITED STATES PATENTS

| | | | |
|---|---|---|---|
| 911,195 | 2/09 | Baker | 189—36 |
| 1,587,690 | 6/26 | Wenn | 153—1 |
| 1,600,570 | 9/26 | Wenn | 153—1 |
| 2,126,544 | 8/38 | Everhard | 189—36 |
| 2,159,355 | 5/39 | Goetz | 153—15 |
| 2,225,592 | 12/40 | MacFadden | 29/453 |

CHARLES W. LANHAM, *Primary Examiner.*

C. D. ANGEL, *Examiner.*